United States Patent
Gundy et al.

(12) 
(10) Patent No.: US 6,739,813 B1
(45) Date of Patent: May 25, 2004

(54) PLASTIC ENCAPSULATED BOLT AND ANCHOR ASSEMBLY

(75) Inventors: William P. Gundy, P.O. Box 15, Milford, NH (US) 03055; Russell Wilmot, Bedford, NH (US)

(73) Assignee: William P. Gundy, Milford, NH (US)

( * ) Notice: Subject to any disclaimer, the term of this patent is extended or adjusted under 35 U.S.C. 154(b) by 0 days.

(21) Appl. No.: 09/575,046

(22) Filed: May 19, 2000

(51) Int. Cl.[7] .................. F16B 13/06; F16B 19/00; F16B 33/00

(52) U.S. Cl. ................. 411/60.2; 411/55; 411/377; 411/908; 411/914

(58) Field of Search .................. 411/15, 57.1, 60.2, 411/55, 372.5, 372.6, 373, 377, 908, 182, 914

(56) References Cited

U.S. PATENT DOCUMENTS

| | | | |
|---|---|---|---|
| 1,738,609 A | * 12/1929 | Pivonski et al. | 411/60.2 |
| 2,765,697 A | * 10/1956 | Brush | 411/15 |
| 3,110,337 A | * 11/1963 | Biesecker | 411/15 |
| 3,457,823 A | * 7/1969 | Dillon | 411/373 |
| 4,078,470 A | 3/1978 | Zeranick, Jr. et al. | |
| 4,083,288 A | 4/1978 | Williams | |
| 4,240,323 A | * 12/1980 | Kojima | 411/182 X |
| 4,274,323 A | 6/1981 | Resnicow | 411/433 |
| 4,391,559 A | 7/1983 | Mizusawa | 411/45 |
| 4,610,587 A | * 9/1986 | Wollar et al. | 411/182 X |
| 4,681,497 A | 7/1987 | Berecz | 411/377 |
| 4,717,302 A | 1/1988 | Adams et al. | 411/378 |
| 4,802,807 A | 2/1989 | Offenburger et al. | 411/387 |
| 4,861,198 A | 8/1989 | Stankus | 405/261 |
| 4,907,923 A | 3/1990 | McGrath, Jr. | 411/107 |
| 5,000,640 A | 3/1991 | Haas, Jr. | 411/432 |
| 5,049,014 A | * 9/1991 | Lemke | 411/908 X |
| 5,098,240 A | 3/1992 | Gapp et al. | 411/424 |
| 5,342,157 A | 8/1994 | Fischer | 411/60 |
| 5,344,257 A | 9/1994 | Wright et al. | 405/259.4 |
| 5,431,516 A | 7/1995 | Haage et al. | 411/55 |

OTHER PUBLICATIONS micro plastics,® inc.; Catalog;; p. 15; World–Wide–Web.

* cited by examiner

*Primary Examiner*—Neill Wilson
(74) *Attorney, Agent, or Firm*—Bourque & Associates, P.A.

(57) ABSTRACT

A plastic encapsulated bolt includes a metallic insert having a head (e.g., a hex head, square head, or other type of deformed head) and a shank. An outer plastic layer encapsulates the metallic insert and forms a plastic encapsulated head and a plastic encapsulated shank. The plastic encapsulated shank can be totally or partially threaded. In one application, the plastic encapsulated bolt is used in combination with a plastic female anchor having an internally threaded portion. The plastic female anchor preferably includes multiple sections. The plastic encapsulated bolt includes a tapered threaded nose that engages the internally threaded portion such that the sections of the plastic female anchor expand outwardly as the plastic encapsulated bolt is threaded therein, causing the anchor to engage in an interference fit with a hole, for example, in concrete.

31 Claims, 3 Drawing Sheets

PLASTIC ENCAPSULATED BOLT AND ANCHOR ASSEMBLY

FIELD OF THE INVENTION

The present invention relates to fasteners and more particularly, relates to a plastic encapsulated bolt and a plastic anchor for use therewith.

BACKGROUND OF THE INVENTION

Structural anchors are commonly used to secure or anchor a structural device to a substrate, such as concrete. Structural anchors typically include an internally threaded insert positioned within the concrete or other substrate and an externally threaded bolt that threadably engages the insert. Although such structural anchors are useful in a number of different industries, certain industries, such as rail transportation, telecommunications and water and sewage treatment, require structural anchoring systems that are both non-conductive and non-corrosive.

The serious problems resulting from corrosion in rail systems are discussed in "Stray Current Corrosion", a publication by NACE (National Association of Corrosion Engineers) International.

Existing plastic female anchors, such as the type disclosed in U.S. Pat. Nos. 5,490,750 and 5,641,256, provide effective resistance to conductivity and corrosion. When used with a metallic bolt, however, conductivity and/or corrosion may still be a problem. Existing reinforced plastic bolts might provide resistance to conductivity and corrosion but are not suitable for use in high-strength situations. Epoxy coated fasteners have also been used in an attempt to prevent corrosion, but a hole in the epoxy layer can result in centralized corrosion and a quicker failure than even uncoated metal fasteners.

Accordingly, a need exists for a plastic encapsulated bolt that is non-conductive and non-corrosive and that can be used in high-strength situations. There is also a need for a structural anchoring system that is non-conductive and non-corrosive and that can be used in various industries.

SUMMARY OF THE INVENTION

The present invention features a plastic encapsulated bolt comprising an insert made of metallic material and having a head and a shank. An outer plastic layer encapsulates the insert and forms a plastic encapsulated head and a plastic encapsulated shank. The plastic encapsulated shank includes an externally threaded portion on at least part of a length thereof. The insert can be either a threaded bolt or a bolt blank and, in one example, is made of steel.

The present invention also features a combination bolt and anchor assembly comprising a plastic encapsulated bolt and a plastic female anchor having an internally threaded portion for receiving the plastic encapsulated bolt.

In one embodiment, the plastic encapsulated shank has a tapered threaded nose and the plastic female anchor includes at least two longitudinal slots. The internally threaded portion of the plastic female anchor includes an undersized thread diameter such that the tapered nose of the plastic encapsulated bolt engages the undersized threads and the plastic female insert expands as the plastic encapsulated bolt is threaded therein.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1A:
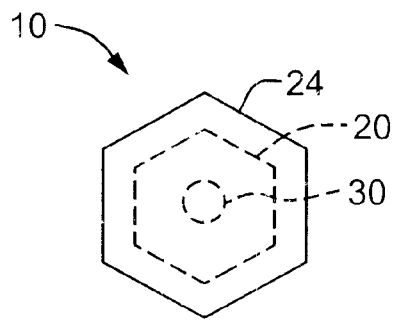
FIG. 1A is a top view of a plastic encapsulated hex head of a plastic encapsulated bolt, according to the present invention.
Figure 1B:
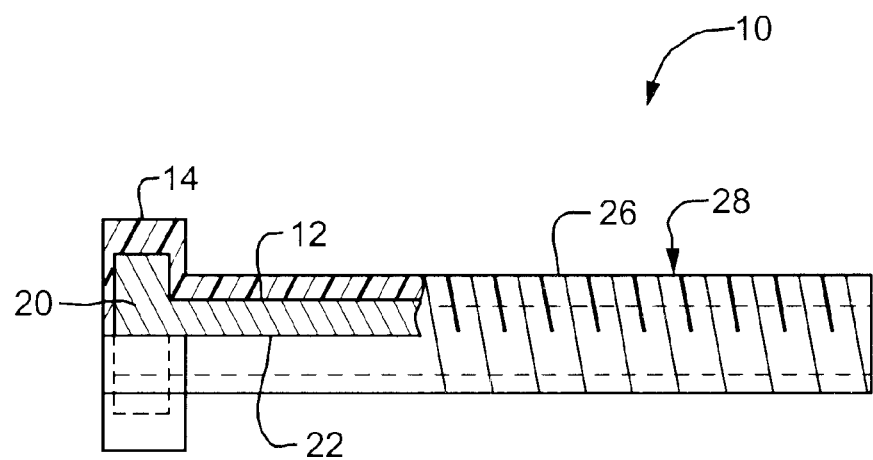
FIG. 1B is a partially cross-sectional side view of the plastic encapsulated bolt, according to the present invention.

A plastic encapsulated bolt 10, FIGS. 1A and 1B, according to the present invention, includes a metallic insert 12 and an outer plastic layer 14 encapsulating the metallic insert 12. The plastic encapsulated bolt 10 has the non-conductive and non-corrosive properties of the plastic layer 14 and also exhibits the high strength (both shear strength and tensile strength) of the embedded metallic insert 12. The plastic encapsulated bolt 10 provides electrical resistivity and helps prevent stray current, chemical, and bacterial corrosion in all applications where corrosive environments exist.

The metallic insert 12 includes a head 20 and a shank 22. In one example, the metallic insert 12 is a standard threaded bolt or bolt blank having a hex head. Although, the exemplary embodiment shows a hex head, other deformed heads having various shapes are contemplated including, but not limited to, square, octagon, round and oval. Metallic inserts 12 other than a bolt or bolt blank can also be used, for example, a cap screw having a deformed screw body or any type of metallic insert having ribs or other type of deformation on the shank. The metallic insert 12 is preferably made of a metallic material that provides the desired strength, such as steel. Other materials providing a high strength are also contemplated.

The outer plastic layer 14 completely encapsulates the metallic insert 12 and takes the shape of the metallic insert 12 forming a plastic encapsulated head 24 (FIG. 1A) and a plastic encapsulated shank 26. By taking the shape of or duplicating the head 20 of the insert 12, the plastic encapsulate head 24 acts as one unit providing structural strength substantially higher than the plastic alone. The plastic encapsulated shank 26 includes an externally threaded portion 28 on the entire length of the shank 26 or on part of the length of the shank 26.

One type of plastic that can be used is nylon or any other industry standard plastic. To make the plastic encapsulated bolt 10, the plastic material is injection molded around the metallic insert 12. The metallic insert 12 can have fixturing capabilities to hold the metallic insert 12 in place during the encapsulation process. In one example, the metallic insert 12 includes fixturing indents 30, such as a recessed socket in the head 20 and/or in the end of the shank 22. The metallic insert 12 is held with fixturing pins (not shown) inserted within the fixturing indent 30. The fixturing pins withdraw during the injection cycle to allow complete encapsulation of the metallic insert 12. Other techniques for holding the metallic insert 12 during the encapsulation process without fixturing are also contemplated.

Figure 2:
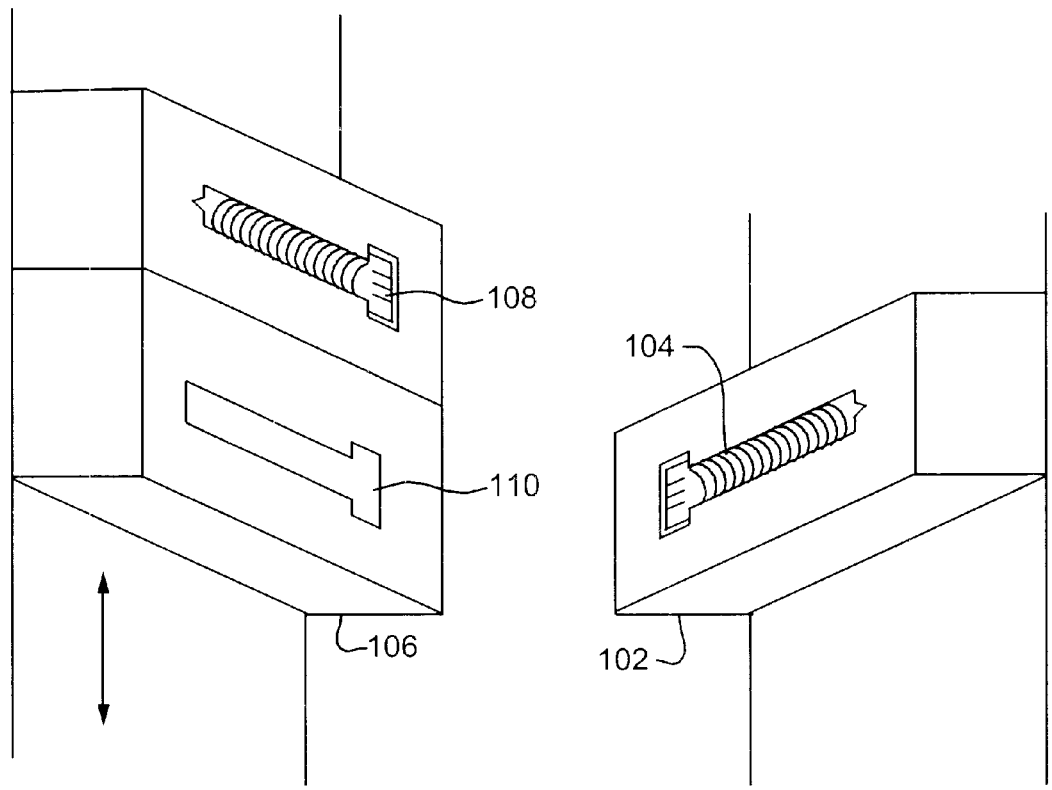
FIG. 2 is a schematic view of a system and method for molding the plastic encapsulated bolt, according to one embodiment of the present invention.

One system and method for manufacturing the plastic encapsulated bolt 10 is shown schematically in FIG. 2. A first mold portion 102 includes a first bolt cavity 104, and a second mold portion 106 includes a second bolt cavity 108 and an insert cavity 110. The insert 12 is inserted into the insert cavity 110, and the first mold portion 102 is closed against the second mold portion 106. Plastic is then injected into the first bolt cavity 104 around the insert 12. The first and second mold portions 102, 106 are then opened, and the bolt cavity 108 of the second mold portion 106 is moved opposite the bolt cavity 104 of the first mold portion 102. The first and second mold portions 102, 106 are then closed, and plastic is injected into the second bolt cavity 108. Other systems and methods can also be used to manufacture the plastic encapsulated bolt 10 according to the present invention.

The plastic encapsulated bolt 10 can be made in various different sizes having different diameters and different lengths depending upon the application and the desired strength. In one example, a ¾" plastic encapsulated bolt can be made using a ½" bolt insert resulting in a thickness of the outer plastic layer 14 on the shank 22 of about ⅛". In another example, a ½ plastic encapsulated bolt is made using a 5/16" bolt insert resulting in a thickness of the outer plastic layer 14 of about 3/32 of an inch. In a further example, a ⅜" plastic encapsulated bolt can be made using a #10 bolt insert resulting in a thickness of the outer plastic layer 14 of about 0.092". Various other sizes are contemplated.

By completely encapsulating the head 20 of the bolt insert 12, the plastic encapsulated bolt 10 is completely non-conductive. The plastic encapsulated head 24 can be grasped and turned just as easily as a head on a standard metal bolt. When used with an internally threaded plastic anchor, as disclosed in greater detail below, the plastic encapsulated bolt 10 can achieve essentially the same thread strength as would a metal bolt used with the plastic female anchor.

Figure 3:
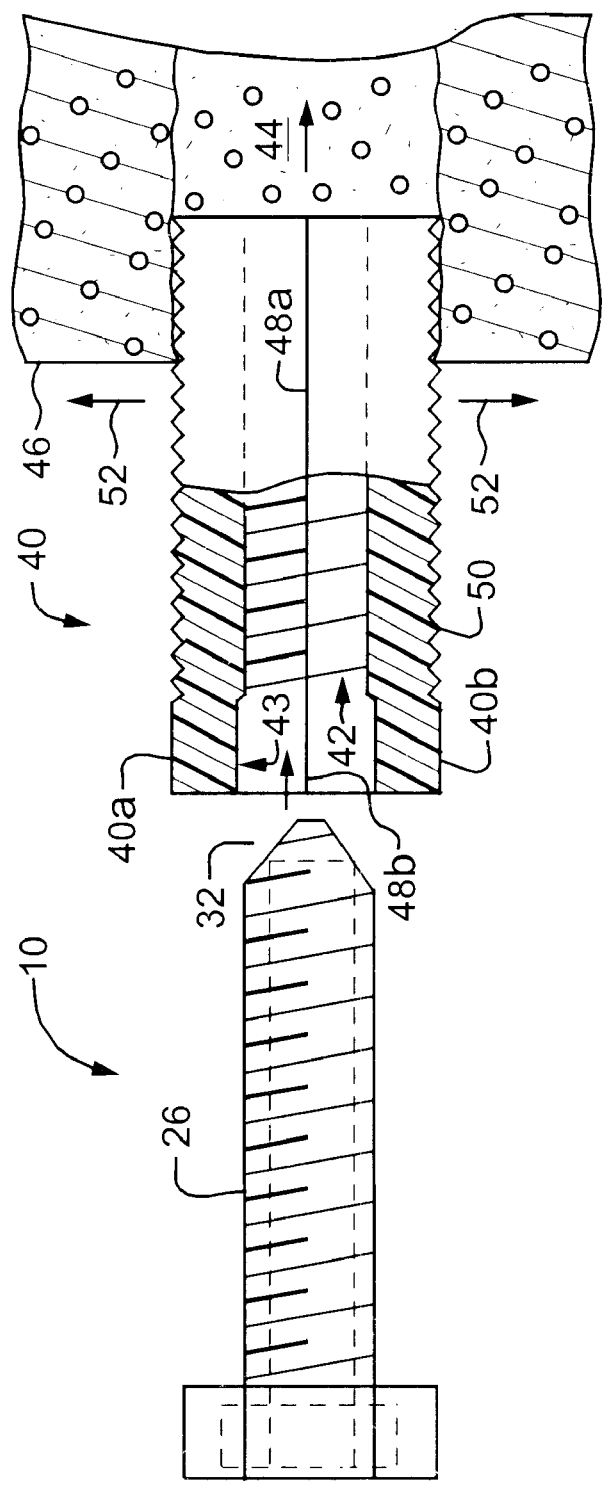
FIG. 3 is a partially cross-sectional side view of a plastic encapsulated bolt and anchor assembly, according to one embodiment of the present invention.

In one application, the plastic encapsulated bolt 10, FIG. 3, is used with a plastic female anchor 40 including an internally threaded portion 42 for receiving the plastic encapsulated bolt 10. The plastic female anchor 40 is positioned within a hole 44 in a substrate such as concrete 46. Together the plastic encapsulated bolt 10 and the plastic female anchor 40 form a non-conductive and non-corrosive anchoring system capable of anchoring structural elements to the concrete 46.

In one embodiment, the plastic female anchor 40 includes two or more sections 40a, 40b separated by two or more slots 48a, 48b, allowing the plastic female anchor 40 to expand when the plastic encapsulated bolt 10 is threaded therein. The outer diameter of the female anchor 40 is slightly less than the inner diameter of the hole 44 in the concrete 46. The outer surface 50 of the female anchor 40 preferably includes ridges or another type of surface structure that will lock into the inner diameter of the hole 44 in an interference fit when expanded. In one example, the outer surface 50 of the female anchor 40 can include longitudinal ribs along at least a portion thereof to provide a non-rotational lock for the anchor when threading the bolt.

According to this embodiment, the plastic encapsulated bolt 10 includes a tapered threaded nose 32. The tapered threaded nose 32 can have a rounded or straight taper. The internal threaded portion 42 of the anchor 40 is sized to engage the tapered threaded nose 32 but is undersized with respect to the remaining outer diameter of the plastic encapsulated shank 26. The tapered threaded nose 32 of the plastic encapsulated bolt 10 engages the undersized internally threaded portion 42, and as the bolt 10 is threaded into the anchor 40, the sections 40a, 40b of the anchor 40 expand outwardly generally in the direction of arrows 52 resulting in an interference fit with the hole 44. The anchor 40 can also include a non-threaded internal portion 43 having an internal diameter that is substantially equal to the diameter of the bolt 10.

The plastic encapsulated bolt of the present invention can also be used with other types of anchors including, but not limited to, the type disclosed in U.S. Pat. Nos. 5,490,750 and 5,641,256, incorporated herein by reference. The plastic encapsulate bolt of the present invention can also be used with other types of mating fasteners or components, such as a nut. The plastic anchor described above can also be used with other types of bolts, such as all plastic bolts or all metal bolts.

Accordingly, the plastic encapsulated bolt and plastic female anchor assembly of the present invention provide structural, non-corrosive, non-conductive anchoring in various industries. The plastic encapsulated bolt, in particular, has non-conductive and non-corrosive properties while also exhibiting greater shear strength than standard plastic bolts.

Modifications and substitutions by one of ordinary skill in the art are considered to be within the scope of the present invention which is not to be limited except by the claims which follow.

What is claimed is:

1. A fastener comprising:
    an insert having a head and a shank, wherein said insert is made of a metallic material; and
    an outer plastic layer encapsulating said insert and forming a plastic encapsulated head and a plastic encapsulated shank, wherein said plastic encapsulated shank includes an externally threaded portion on at least part of a length thereof having a shape independent of said insert.

2. The fastener of claim 1 wherein said insert includes a plurality of protrusions adapted to engage said outer plastic layer.

3. The fastener of claim 2 wherein said insert is a threaded bolt.

4. The fastener of claim 1 wherein said insert is a bolt blank.

5. The fastener of claim 1 wherein said insert is made of steel.

6. The fastener of claim 1 wherein said plastic encapsulated shank has a tapered threaded nose.

7. The fastener of claim 1 wherein said head of said insert includes a fixturing structure.

8. The fastener of claim 1 wherein an entire length of said plastic encapsulated shank is threaded.

9. The fastener of claim 1 wherein said head has a shape selected from the group consisting of a hex head and a square head.

10. The fastener of claim 1 wherein said outer plastic layer duplicates the shape of said head of the metallic insert to form said plastic encapsulated head.

11. A combination fastener and anchor assembly comprising:
    a plastic encapsulated fastener including a metallic insert and a plastic coating encapsulating said metallic insert, said plastic encapsulated fastener having a plastic encapsulated head and a plastic encapsulated shank, wherein said plastic encapsulated shank includes a threaded portion on at least part of a length of said plastic encapsulated shank; and
    a plastic female anchor having an internally threaded portion for receiving said plastic encapsulated fastener.

12. The combination fastener and anchor assembly of claim 11 wherein said plastic encapsulated shank has a tapered threaded nose.

13. The combination fastener and anchor assembly of claim 11 wherein said plastic female anchor includes at least two longitudinal slots to allow expansion of said plastic female anchor, and wherein said internally threaded portion includes undersized threads such that said tapered nose of said plastic encapsulated fastener engages said undersized threads and said plastic female anchor expands as said plastic encapsulated fastener is threaded therein.

14. The combination fastener and anchor assembly of claim 11 wherein said insert is a threaded bolt.

15. The combination fastener and anchor assembly of claim 11 wherein said insert is a bolt blank.

16. The combination fastener and anchor assembly of claim 11 wherein said insert is made of steel.

17. The combination fastener and anchor assembly of claim 11 wherein said outer surface of said plastic anchor includes ridges for engaging a substrate material.

18. A fastener comprising:
    an insert; and
    a rigid, plastic body forming a plastic shank wherein at least a part of said plastic body defines a cavity sized and shaped to accept said insert, wherein at least a portion of said plastic shank includes an externally threaded portion formed from said rigid plastic and having a shape independent of said insert.

19. The fastener as claimed in claim 18 wherein at least said shank portion of said insert includes a plurality of protrusions adapted to engage with an inner surface of said cavity of said plastic body.

20. The fastener of claim 19 wherein said plurality of protrusions include a threaded section.

21. The fastener of claim 18 wherein said insert is a bolt blank.

22. The fastener of claim 18 wherein said insert is made of metallic material.

23. The fastener of claim 18 wherein said plastic shank has a tapered, threaded nose.

24. The fastener of claim 18 wherein said insert includes a head having a fixturing structure.

25. The fastener of claim 18 wherein an entire length of said plastic shaft is threaded.

26. The fastener of claim 25 wherein said insert is a threaded bolt disposed of substantially concentrically with said rigid, plastic body.

27. The fastener of claim 18 wherein a first and a second end of said plastic shaft are threaded.

28. The fastener of claim 18 wherein said rigid, plastic body further includes a plastic head disposed proximate a first end of said plastic shaft.

29. A fastener comprising:
    an insert having a head and a shank, wherein said insert is made of metallic material; and
    an outer plastic layer encapsulating said insert and forming a plastic encapsulated head and a plastic encapsulated shank, wherein said plastic encapsulated shank has a tapered threaded nose and includes an externally threaded portion on at least part of a length thereof.

30. A fastener comprising:
    a metallic insert including a shank and a head having a fixturing structure; and
    an outer plastic layer encapsulating said insert and forming a plastic encapsulated head and a plastic encapsulated shank, wherein said plastic encapsulated shank includes an externally threaded portion on at least part of a length thereof.

31. A fastener comprising:
    an insert having a head and a shank, wherein said insert is made of metallic material, and
    an outer plastic layer encapsulating said insert and forming a plastic encapsulated head and a plastic encapsulated shank, wherein an entire length of said plastic encapsulated shaft is threaded.

* * * * *